United States Patent
Kuse

[11] 3,784,281
[45] Jan. 8, 1974

[54] FERRIMAGNETIC GARNET CORRECTED FOR TEMPERATURE DEPENDENCE OF THE FARADAY EFFECT AND METHOD FOR MAKING THE SAME

[75] Inventor: Dieter Kuse, Niederrohrdorf, Switzerland

[73] Assignee: Brown Boveri & Company Limited, Baden, Switzerland

[22] Filed: Mar. 6, 1973

[21] Appl. No.: 338,632

Related U.S. Application Data

[62] Division of Ser. No. 153,740, June 16, 1971, abandoned.

[52] U.S. Cl. .................. 350/151, 350/150, 350/160
[51] Int. Cl. .................................................. G02f 1/22
[58] Field of Search ................ 350/147, 150, 151, 350/160

[56] References Cited
UNITED STATES PATENTS

| | | | |
|---|---|---|---|
| 3,558,214 | 1/1971 | De Lang | 350/150 |
| 3,558,215 | 1/1971 | De Lang | 350/150 |

*Primary Examiner*—David Schonberg
*Assistant Examiner*—Michael J. Tokar
*Attorney*—Wolfgang G. Fasse

[57] ABSTRACT

A ferrimagnetic garnet having the general composition $Y_{3-x} Gd_x Fe_5 O_{12}$ in which x has a value between 0 and 3 at which, for a given wavelength, the temperature dependence of the Faraday effect is corrected.

4 Claims, 4 Drawing Figures

FERRIMAGNETIC GARNET CORRECTED FOR TEMPERATURE DEPENDENCE OF THE FARADAY EFFECT AND METHOD FOR MAKING THE SAME

This is a divisional application of my copending U.S. Pat. application Ser. No. 153,740; filed: June 16, 1971 now abandoned.

This invention relates to a ferrimagnetic garnet in which the temperature dependence of the Faraday effect is corrected and to a method for making the garnet.

Ferrimagnetic garnets are of major importance in the manufacture of microwave components such as, for example, non-reciprocal components (see for example Meinke/Gundlach "Taschenbuch der Hochfrequenz-Technik" 2nd Edition, page 393). In order to influence electromagnetic waves in such components the Faraday effect inherent in these materials is usually exploited. In the Faraday effect the inclination of the plane of polarisation of a linearly polarised electromagnetic wave propagating through the garnet, is rotated proportionally to the projection of the vector $\vec{M}$ of the garnet magnetisation onto the radiation direction $\vec{r}$, and to the distance travelled '1' by the wave through the garnet. The angle of rotation, in the case of ferrimagnetic materials magnetised up to the saturation point, is expressed by the formula:

$$\theta = \vec{M} \cdot \vec{r} \cdot 1 \cdot \alpha_F |M|$$

where $\alpha_F$ is a constant of the material, which is dependent upon the temperature T of the garnet and the wavelength $\lambda$ of the electromagnetic wave. In a less strongly magnetised material, the angle of rotation is smaller and the relationships may be complicated by domain formation.

Materials of the above kind have also recently found application in the very important ultra-red wavelength range of $\lambda = 1$ to $7\mu$ (He-Ne laser). However the magnetisation M and also the constant $\alpha_F$, exhibit a close dependence upon temperature. Although it has been found possible to produce garnets in which the magnetisation has a negligible temperature coefficient at a specific working temperature (J. of the Am. Ceramic Society 48 [1965], page 369 ff. and page 516 ff.), garnets which, at suitable working or operating temperatures and at wavelengths of 1 to $7\mu$, satisfy the condition $d\alpha_F/dT = 0$, have not thus far been found.

It is therefore the object of the invention to provide a ferrimagnetic garnet in which, in the vicinity of a working temperature which is selectable within a wide range, the quantity $\alpha_F$ exhibits no temperature dependence, i.e., in which the condition $d\alpha_F/dT = 0$ is satisfied.

In accordance with the invention this object is achieved by producing a gadolinium-substituted yttrium-iron-garnet of the composition $Y_{3-x}Gd_xFe_5O_{12}$. The selection of the gadolinium content $x$ is dependent upon the temperature at which the garnet is to be operated, so that for increases in operating temperature, the selected value of $x$ is increased approximately in proportion to the temperature increase.

A garnet having the composition according to the invention is transmissive for wavelengths $\lambda$ of around 1 to $7\mu$. In accordance with a particular embodiment of the invention, for increasing wavelength $\lambda$, the slope of the curve defining the dependence of $x$ upon T, and in accordance with which the gadolinium content $x$ is selected in dependence upon the operating temperature, should decrease. The values of $x$ for temperatures below about 320° K should be greater than the $x$ values for shorter wavelengths.

Further details of the invention will be apparent from the following examples which are explained with reference to the accompanying drawings, in which.

Figure 1:
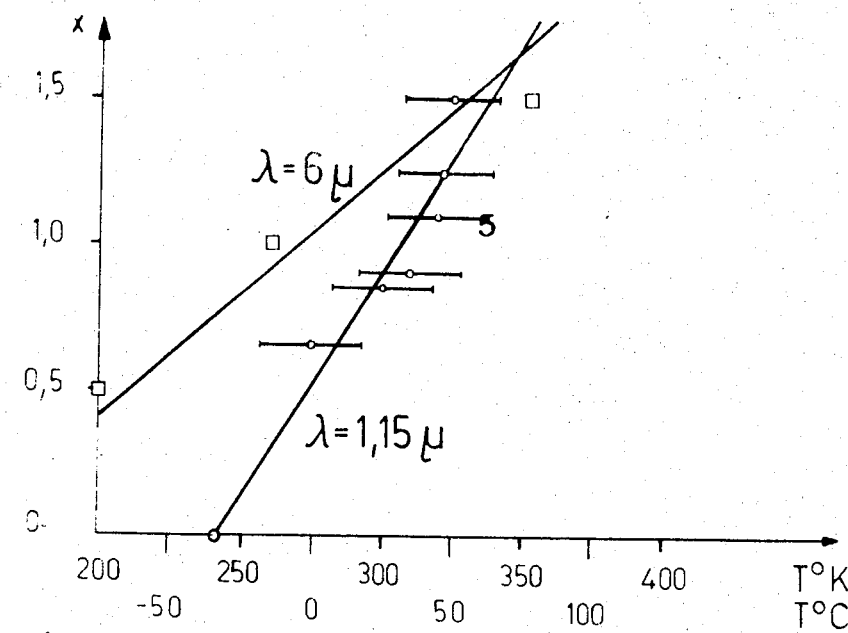
FIG. 1 illustrates the dependence of the gadolinium content x which is optimum for temperature compensation, upon the working or operating temperature T envisaged for the garnet, at the wavelength $\lambda = 1.15$ and $\lambda = 6\mu$.

FIG. 1 shows the value of the gadolinium content $x$ of a mixed system $Y_{3-x}Gd_xFe_5O_{12}$ which should be selected according to the invention for a predetermined operating temperature T of the garnet and a given wavelength $\lambda$, when manufacturing the garnet, so that optimum temperature compensation ($d\alpha_F/dT = 0$) is achieved. In this context, the manufacturing method can for example be of the kind indicated in "Growth of large Yttrium and Rare-earth Aluminum and Iron Garnets," by Grodkiewicz, Dearborn and van Uitert, in "Crystal Growth," Proceedings of an International Conference on Crystal Growth, Boston, U.S.A. edited by H. S. Peiser, Pergamon Press 1967.

As can be seen, at low temperatures of around 240° K ($\approx -30°$ C) and at an He-Ne laser wavelength $\lambda = 1.15\mu$, an yttrium-iron-garnet without any gadolinium content is advantageous.

At room temperature (T$\approx$295° K) a gadolinium content of $x = 0.85$ produces a garnet with particularly good temperature stability. Towards the longwave end of the usuable spectrum, the optimum values of $x$, below an operating temperature of about 320° K, are slightly above the $x$ values for shorter wave radiation. In a range of 320° K ($\approx 50°$ C), the optimum $x$ values are the same throughout the entire usable spectrum.

Figure 2:
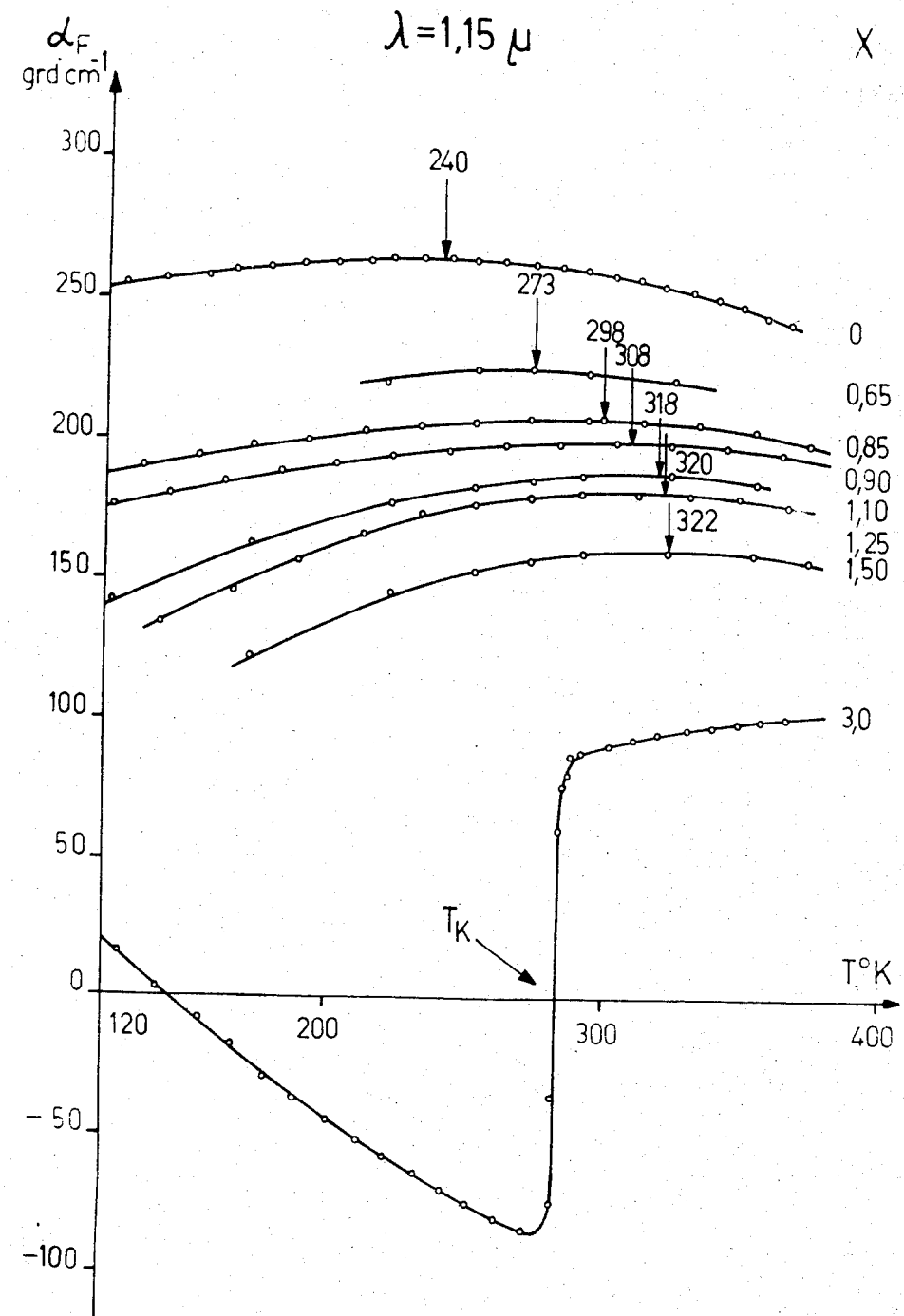
FIG. 2 illustrates the dependence of the quantity $\alpha_F$ upon the operating temperature T, with the gadolinium content $x$ as a parameter, for the wavelength $\lambda = 1.15$ of operation of a He-Ne laser.

In FIG. 2, the temperature-dependence of $\alpha_F$ for the mixed system $Y_{3-x}Gd_xFe_5O_{12}$, at several values of $x$, is illustrated in respect of the particularly important (as far as practical application is concerned) wavelength $\lambda = 1.15\mu$ of the He-Ne laser, which is near the shortwave end of the usable spectrum. The graphs were obtained from actual measurements.

For $x = 0$, i.e., a gadolinium-free iron-garnet, $\alpha_F$ passes through a flat peak ($\alpha_{Fmax} = 265°$/cm) at 240° K.

In the neighborhood of this peak or maximum, $\alpha_F$ varies by less than 1 percent over a temperature range of around 100°. With rising gadolinium content, $\alpha_F$ and therefore the Faraday rotation 0, becomes smaller but the peak is displaced towards higher temperatures. In the case of pure $Gd_3Fe_5O_{12}(x = 3)$, it is above 370° K.

At the ferrimagnetic compensation temperature $T_K$ (the material is antiferromagnetic, M = 0), a shift in the Faraday rotation takes place. For $x = 3$, $T_K$ is nearer to room temperature but as $x$ rises $T_K$ drops off very rapidly and for practical purposes presents no problem.

Figure 3:
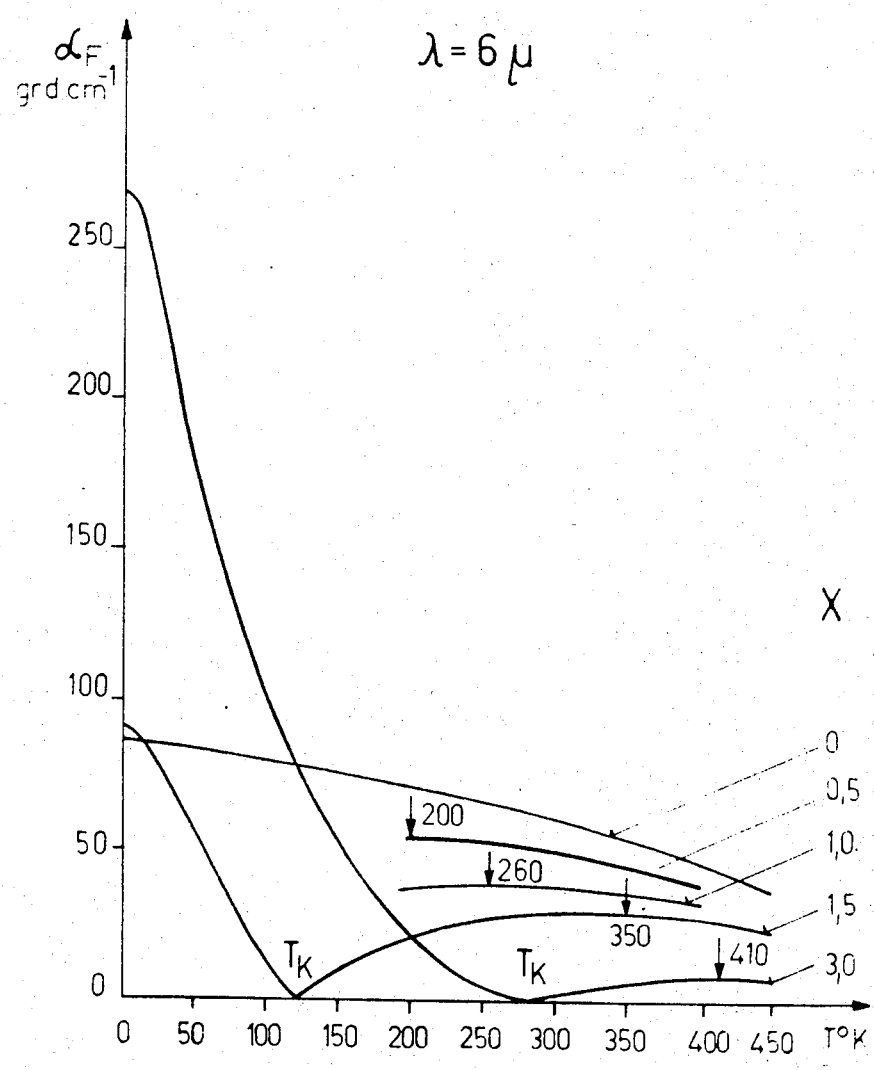
FIG. 3 illustrates the dependence of the quantity $\alpha_F$ upon the operating temperature T, with the gadolinium content $x$ as a parameter, for the wavelength $\lambda = 6\mu$.

The method proposed in accordance with the invention for compensating the temperature coefficient of $\alpha_F$ is applicable throughout the entire usable spectrum and, as already mentioned, the optimum $x$ values vary slightly with the wavelength. FIG. 3 illustrates an $\alpha_F(T)$ curve for $\lambda = 6\mu$. This was determined by calculation from the formula.

$$\alpha_F = 0.211 \cdot n \cdot M_s \text{ Gauss degrees cm}^{-1}$$

which is applicable for wavelengths of $\lambda \gtrsim 5\mu$ (G.S. Krinchik and M. V. Chetkin, Societ. Phys. J.E.T.D. 14, 485 (1962) where $n$ = refractive index, $M_s$ = saturation magnetisation.

Figure 4:
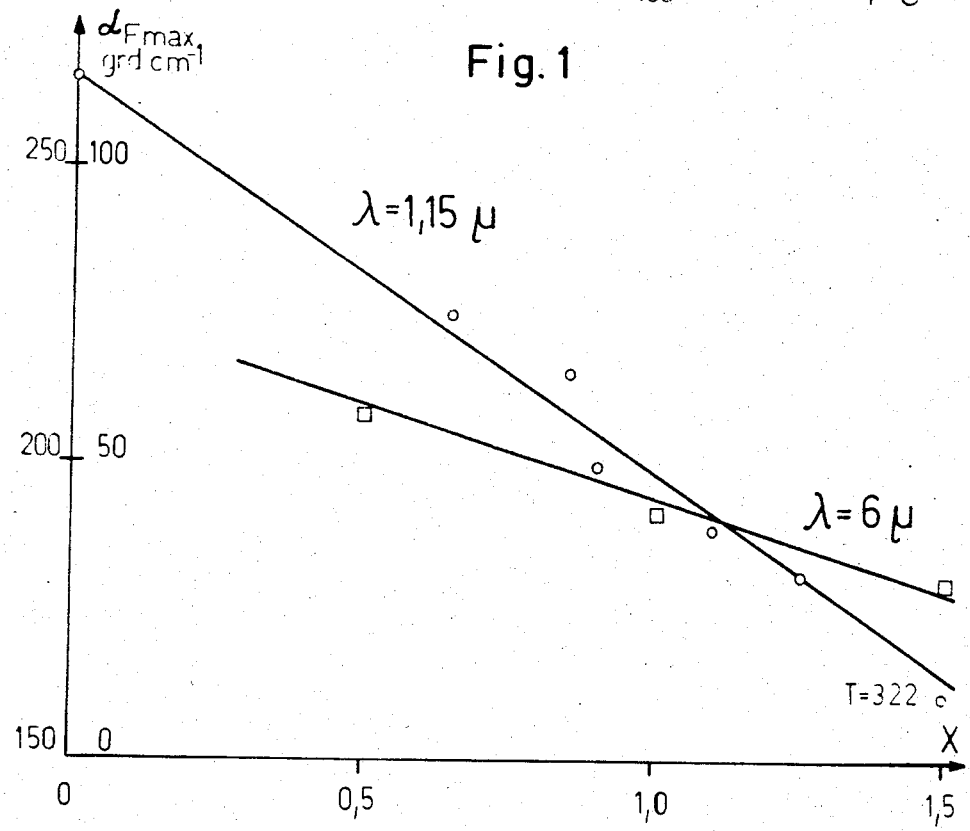
FIG. 4 illustrates the dependence of the value $\alpha_{Fmax}$ upon the gadolinium content $x$, for the condition $d\alpha_F/dT = 0$.

In FIG. 4, the dependence of the peak value $\alpha_{Fmax}$ (for $d\alpha_F/dt = 0$) upon the gadolinium content $x$, is plotted for the wavelengths $\lambda = 1.15\mu$ and $\lambda = 6\mu$. On the ordinates at the left, values for $\lambda = 1.15\mu$, and at the right values for $\lambda = 6\mu$.

As can be seen and as FIGS. 2 and 3 illustrate, the value of $\alpha_{Fmax}$ decreases with rising $x$. Because, as illustrated above, the change in $\alpha_{Fmax}$ is slight in the proximity of the peak over a wide temperature range (e.g. $\pm 50°$ C), it may often be convenient in respect of a given operating temperature, to so select the gadolinium content $x$ that although a finite, low $d\alpha_F/dT$ is obtained, the $\alpha_F$ value which determines the magnitude of the Faraday rotation O, is adequately large.

The temperature-stabilized garnet in accordance with the invention can advantageously be employed at laser wavelengths in a manner analogous to components employed in microwave work and based upon the Faraday effect. The garnet is thus of major significance for communications applications at optical frequencies. Thus, it can be used in the construction of rotators, insulators, circulators, modulators and the like. The operation of these components is based partly upon nonreciprocity of the Faraday effect, and partly upon the capability of varying the rotation by varying the projection of the magnetisation onto the radiation direction. Applications of the described kind are indicated for example in J. Appl. Phys. 39 (1968), Page 922 or in Optics and Spectroscopy 26 (1969), Page 272.

A preferred application of the temperature-stabilised garnet in accordance with the invention is in arrangements for the potential free measurement of the current in high voltage and EHT lines, as described for example in French Pat. No. 1,439,260 or IEEE J. of Quantum Electronics QE-2, 8 (1966), Page 255. In the arrangement disclosed in the last mentioned literature reference, an He-Ne laser and flint glass are used as a Faraday rotator. Since Faraday rotation in the garnet described is many times greater than in flint glass, substitution of the flint glass by the garnet obviously constitutes a considerable advantage.

What is claimed is:

1. A method of using a gadolinium substituted yttrium-iron garnet of the composition $Y_{3-x} Gd Fe_5 O_{12}$, comprising subjecting said garnet to electromagnetic radiation of the wavelength $\lambda = 1.15\mu$ and to a temperature range of $T \pm 15°$ K wherein $x$ and $T$ are defined in accordance with the following table:

| $x$ | T (°substantially |
|---|---|
| 0 | 240 |
| 0.65 | 273 |
| 0.85 | 298 |
| 0.90 | 308 |
| 1.10 | 318 |
| 1.25 | 320 |
| 1.50 | 322 | whereby the Faraday effect is substnatially independent of temperature within said temperature range.

2. A method of using a gadolinium substituted yttrium-iron garnet of the composition $Y_{3-x} Gd Fe_5 O_{12}$, comprising subjecting said garnet to electromagnetic radiation of the wavelength $\lambda = 6\mu$ and to a temperature range $T \pm 40°$ K, where $x$ and $T$ are defined in accordance with the following table:

| $x$ | T (°K) |
|---|---|
| 0.5 | 200 |
| 1.0 | 260 |
| 1.5 | 350 |
| 3.0 | 410 | whereby the Faraday effect is substantially independent of temperature within said temperature range.

3. An electromagnetic wave influencing component comprising a gadolinium substituted yttrium-iron garnet of the composition $Y_{3-x} Gd Fe_5 O_{12}$, and means for simultaneously subjecting said garnet to a temperature range of $T \pm 15°$ K and to an electromagnetic radiation of the wavelength $\lambda = 1.15\mu$ wherein $x$ and $T$ are determined in accordance with the following table:

| $x$ | T (°K) |
|---|---|
| 0 | 240 |
| 0.65 | 273 |
| 0.85 | 298 |
| 0.90 | 308 |
| 1.10 | 318 |
| 1.25 | 320 |
| 1.50 | 322 | whereby the Faraday effect in said garnet is substantially independent of temperature within said temperature range.

4. An electromagnetic wave influencing component comprising a gadolinium substituted yttrium-iron garnet of the composition $Y_{3-x} Gd Fe_5 O_{12}$, and means for simultaneously subjecting said garnet to a temperature range of $T \pm 40°$ K and to an electromagnetic radiation wavelength $\lambda = 6\mu$, wherein $x$ and $T$ are determined in accordance with the following table:

| $x$ | T (°K) |
|---|---|
| 0.5 | 200 |
| 1.0 | 260 |
| 1.5 | 350 |
| 3.0 | 410 | whereby the Faraday effect is substantially independent of temperature within said temperature range.

* * * * *